US012731599B2

(12) United States Patent
Scaini et al.

(10) Patent No.: US 12,731,599 B2
(45) Date of Patent: Sep. 8, 2026

(54) ADAPTIVE NOISE ESTIMATION

(71) Applicants: Dolby Laboratories Licensing Corporation, San Francisco, CA (US); DOLBY INTERNATIONAL AB, Dublin (IE)

(72) Inventors: Davide Scaini, Barcelona (ES); Chunghsin Yeh, Barcelona (ES); Giulio Cengarle, Barcelona (ES); Mark David de Burgh, Mount Colah (AU)

(73) Assignees: Dolby Laboratories Licensing Corporation, San Francisco, CA (US); DOLBY INTERNATIONAL AB, Dublin (IE)

( * ) Notice: Subject to any disclaimer, the term of this patent is extended or adjusted under 35 U.S.C. 154(b) by 401 days.

(21) Appl. No.: 18/044,777

(22) PCT Filed: Sep. 21, 2021

(86) PCT No.: PCT/US2021/051162
§ 371 (c)(1),
(2) Date: Mar. 9, 2023

(87) PCT Pub. No.: WO2022/066590
PCT Pub. Date: Mar. 31, 2022

(65) Prior Publication Data

US 2024/0013799 A1 Jan. 11, 2024

Related U.S. Application Data

(60) Provisional application No. 63/168,998, filed on Mar. 31, 2021, provisional application No. 63/120,253, filed on Dec. 2, 2020.

(30) Foreign Application Priority Data

Sep. 23, 2020 (ES) ............................... ES202030960

(51) Int. Cl.
*G10L 21/0232* (2013.01)
*G10L 21/028* (2013.01)
(Continued)

(52) U.S. Cl.
CPC ........ *G10L 21/0232* (2013.01); *G10L 21/028* (2013.01); *G10L 21/034* (2013.01);
(Continued)

(58) Field of Classification Search
CPC . G10L 21/0232; G10L 21/028; G10L 21/034; G10L 21/0364; G10L 21/0208;
(Continued)

(56) References Cited

U.S. PATENT DOCUMENTS 6,347,297 B1 * 2/2002 Asghar .................. G10L 15/02 704/243
6,453,289 B1 9/2002 Ertem
(Continued)

FOREIGN PATENT DOCUMENTS

CN 1354871 A 6/2002
CN 1384960 A 12/2002
(Continued)

OTHER PUBLICATIONS

Brueckmann et. al., Adaptive Noise Reduction and Voice Activity Detection for improved Verbal Human-Robot Interaction using Binaural Data, Proceedings 2007 IEEE International Conference on Robotics and Automation.
(Continued)

*Primary Examiner* — Paras D Shah
*Assistant Examiner* — Nadira Sultana

(57) ABSTRACT

In some embodiments, a method, comprises: dividing, using at least one processor, an audio input into speech and non-speech segments; for each frame in each non-speech segment, estimating, using the at least one processor, a
(Continued)

time-varying noise spectrum of the non-speech segment; for each frame in each speech segment, estimating, using the at least one processor, speech spectrum of the speech segment; for each frame in each speech segment, identifying one or more non-speech frequency components in the speech spectrum; comparing the one or more non-speech frequency components with one or more corresponding frequency components in a plurality of estimated noise spectra and selecting the estimated noise spectrum from the plurality of estimated noise spectra based on a result of the comparing.

15 Claims, 6 Drawing Sheets

(51) Int. Cl.
*G10L 21/034* (2013.01)
*G10L 21/0364* (2013.01)
*G10L 25/18* (2013.01)
*G10L 25/21* (2013.01)
*G10L 25/84* (2013.01)

(52) U.S. Cl.
CPC .......... *G10L 21/0364* (2013.01); *G10L 25/18* (2013.01); *G10L 25/21* (2013.01); *G10L 25/84* (2013.01)

(58) Field of Classification Search
CPC ..... G10L 21/0238; G10L 25/18; G10L 25/21; G10L 25/08; G10L 25/84; G10L 25/78; G10L 15/22; G10L 19/22
See application file for complete search history.

(56) References Cited

U.S. PATENT DOCUMENTS 7,039,181 B2 5/2006 Marchok
7,660,714 B2 * 2/2010 Furuta ................. G10L 21/0208 704/226
8,600,073 B2 12/2013 Sun
8,694,311 B2 * 4/2014 Jung ................... G10L 21/0208 704/226
8,909,522 B2 12/2014 Shperling
8,990,073 B2 3/2015 Malenovsky
9,570,093 B2 * 2/2017 Gao ........................ G10L 19/22
9,576,590 B2 2/2017 Sjoberg
9,721,580 B2 8/2017 Skoglund
9,754,608 B2 9/2017 Souden
9,812,149 B2 11/2017 Yen
9,978,394 B1 * 5/2018 Su ........................ G10L 21/0232
10,199,033 B1 * 2/2019 Yano ................ G10K 11/17823
11,146,607 B1 * 10/2021 Tang ........................ H04R 3/04
2003/0078772 A1 * 4/2003 Wu ..................... G10L 21/0208 704/226
2005/0286664 A1 * 12/2005 Chen .................. H04L 65/4038 375/349
2009/0012786 A1 1/2009 Zhang
2011/0099007 A1 * 4/2011 Zhang ..................... G10L 25/78 704/226
2012/0197634 A1 * 8/2012 Ishikawa ............... G10L 21/043 704/201
2017/0345439 A1 * 11/2017 Jensen ................. H04R 25/505
2018/0033447 A1 * 2/2018 Ramprashad ........... G10L 25/21
2019/0013036 A1 * 1/2019 Graf ........................ G10L 15/22
2019/0206420 A1 7/2019 Kandade Rajan et al.
2020/0312294 A1 * 10/2020 Isberg ................ G10K 11/1752

FOREIGN PATENT DOCUMENTS

GB 2426167 B 10/2007
JP 2001318687 A 11/2001
JP 2006039547 A * 2/2006 ......... G10L 21/0208
JP 4765461 B2 * 9/2011 ......... G10L 21/0208
KR 20070108598 A * 5/2006 ......... G10L 21/2008
KR 20100045933 A 5/2010
WO 2021148342 A1 7/2021

OTHER PUBLICATIONS

Doblinger, Gerhard "Computationally Efficient Speech Enhancement by Spectral Minima Tracking in Subbands" Proc. Eurospeech, pp. 1513-1516, 1995.
Martin, Rainer "Noise Power Spectral Density Estimation Based on Optimal Smoothing and Minimum Statistics" IEEE Transactions on Speech and Audio Processing, vol. 9, Issue 5, pp. 504-512, Jul. 2001.
Stylianou, Yannis. "Harmonic plus noise models for speech, combined with statistical methods, for speech and speaker modification." Ph. D thesis, Ecole Nationale Superieure des Telecommunications (1996).
Yeh, C., "Multiple Fundamental Frequency Estimation of Polyphonic Recordings," Ph.D. thesis, 2008, University Paris 6.
Z. Zhang, K. Honda and J. Wei, "Retrieving Vocal-Tract Resonance and anti-Resonance From High-Pitched Vowels Using a Rahmonic Subtraction Technique," ICASSP 2020—2020 IEEE International Conference on Acoustics, Speech and Signal Processing (ICASSP), Barcelona, Spain, 2020, pp. 7359-7363.

* cited by examiner

ADAPTIVE NOISE ESTIMATION

CROSS-REFERENCE TO RELATED APPLICATIONS

This application is a U.S. National Stage of International Application No. PCT/US2021/051162, filed Sep. 21, 2021, which claims the benefit of priority from U.S. Provisional Patent Application 63/120,253, filed Dec. 2, 2020, U.S. Provisional Application No. 63/168,998, filed Mar. 31, 2021 and Spanish Patent Application No. P202030960, filed Sep. 23, 2020, each of which is hereby incorporated by reference in its entirety.

TECHNICAL FIELD

This disclosure relates generally to audio signal processing, and in particular to estimating a noise floor in an audio signal for use in noise reduction.

BACKGROUND

Noise estimation is commonly used to reduce the steady state noise in an audio recording. Typically, the noise estimate is obtained by analyzing the energy in each frequency band over a segment of the audio recording that contains only noise. In some audio recordings, however, the steady state noise changes over time, smoothly and/or abruptly. Some examples of such abrupt changes include audio recordings where background environmental noise changes abruptly over time (e.g., a fan is switched on or off in the room), and audio content obtained by editing together different audio recordings each with a different noise floor, such as a podcast containing a sequence of interviews recorded at different locations. Additionally, a change in the noise does not typically happen during sufficiently long segments of non-speech, and hence a change in noise may not be detected and estimated early in the audio recording.

Some existing methods perform a single estimation of the noise floor using a segment of the audio recording that contains only noise. Other existing methods perform an analysis on the entire audio recording that converges to a single underlying noise floor. A drawback of both these methods, however, is that they fail to adapt to changing noise levels or spectra. Other existing methods estimate a minimum envelope of the energy in each frequency band and track the estimated minimum envelope over time (e.g. by smoothing the estimated minimum envelope with a suitable time constant(s)). These existing methods, however, are commonly employed in real-time online audio signal processing architectures and cannot react accurately to sudden changes of noise in an audio recording.

SUMMARY

Implementations are disclosed for adaptive noise estimation.

In some embodiments, a method of adaptive noise estimation comprises: dividing, using at least one processor, an audio input into speech and non-speech segments; for each frame in each non-speech segment, estimating, using the at least one processor, a time-varying noise spectrum of the non-speech segment; for each frame in each speech segment, estimating, using the at least one processor, speech spectrum of the speech segment; for each frame in each speech segment, identifying one or more non-speech frequency components in the speech spectrum; comparing the one or more non-speech frequency components with one or more corresponding frequency components in a plurality of estimated noise spectra; and selecting the estimated noise spectrum from the plurality of estimated noise spectra based on a result of the comparing. In an embodiment, the method further comprises: reducing, using the at least one processor, noise in the audio input using the selected estimated noise spectrum.

In some embodiments, the method further comprises: obtaining a probability of speech in each frame of the audio input and identifying the frame as containing speech based on the probability.

In some embodiments, the time-varying noise spectrum is estimated by computing a moving average of power spectra of the non-speech segments, and averaging the power spectra of a current non-speech segment and at least one past non-speech segment.

In some embodiments, during the non-speech segments the time-varying estimated noise spectrum is fed to a noise reduction unit configured to reduce the noise in the audio input using the selected estimated noise spectrum.

In some embodiments, for each speech segment, a past estimated noise spectrum before the speech segment, a future estimated noise spectrum after the speech segment and a current speech frame, are used to determine the estimated noise spectrum that has the highest likelihood to represent noise in the current speech segment.

In some embodiments, determining the estimated noise spectrum that has the highest likelihood to represent the noise of the current speech segment, further comprises: obtaining an average noise spectrum from past and future noise spectra of past and future non-speech segments before and after the speech segment, respectively; determining an upper frequency limit for the past and future noise spectra; determining a cutoff frequency to be the lowest of the two upper frequency limits; computing a distance metric between frequency components in the speech spectrum and frequency components in the noise spectra; and selecting one of the past or future noise spectrum that has the smallest distance metric up to the cutoff frequency as the estimated noise spectrum for the audio input.

In some embodiments, the distance metric is averaged over a set of speech frames in a speech segment.

In some embodiments, speech components are estimated in the speech segments of the audio signal, and then subtracted from actual speech components to obtain a residual spectrum as the estimation of the non-speech frequency components.

In some embodiments, an audio processor comprises: a divider unit configured to divide an audio input into segments of overlapping frames; a plurality of buffers configured to store the segments of overlapping frames; a spectrum analysis unit configured to compute a frequency spectrum for each segment stored in each buffer; a voice activity detector (VAD) configured to detect speech and non-speech segments in the audio input; an averaging unit coupled to the output of the VAD and configured to compute, for each speech segment identified by the VAD output, speech spectra and for each non-speech segment identified by the VAD output, noise spectra.

In an embodiment, an audio processor comprises: a VAD configured to detect speech and non-speech segments in audio input; an averaging unit coupled to the output of the VAD and configured to obtain, for each speech segment identified by the VAD output, a speech spectrum and for each non-speech segment identified by the VAD output, a noise spectrum; a similarity metric unit configured to compute a similarity metric between one or more frequency components in a current speech spectrum and corresponding one or more frequency components in each noise spectrum, and to select one noise spectrum from the noise spectra based on the similarity metric; and a noise reduction unit configured to use the selected noise spectrum to reduce noise in the audio input.

Other implementations disclosed herein are directed to a system, apparatus and computer-readable medium. The details of the disclosed implementations are set forth in the accompanying drawings and the description below. Other features, objects and advantages are apparent from the description, drawings and claims.

Particular implementations disclosed herein provide one or more of the following advantages. A method of adaptively estimating noise in an audio recording in the presence of speech is disclosed. In an embodiment, adaptive noise estimation is performed offline on the audio recording to estimate noise changes by looking both before and after a given frame of the audio recording. An advantage compared to traditional adaptive noise estimation methods is that the noise floor under the speech is estimated by selecting among the best available candidate noise floor estimates computed before and after a current speech segment.

DESCRIPTION OF DRAWINGS

In the drawings, specific arrangements or orderings of schematic elements, such as those representing devices, units, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some implementations.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths, as may be needed, to affect the communication.

The same reference symbol used in various drawings indicates like elements.

DETAILED DESCRIPTION

In the following detailed description, numerous specific details are set forth to provide a thorough understanding of the various described embodiments. It will be apparent to one of ordinary skill in the art that the various described implementations may be practiced without these specific details. In other instances, well-known methods, procedures, components, and circuits, have not been described in detail so as not to unnecessarily obscure aspects of the embodiments. Several features are described hereafter that can each be used independently of one another or with any combination of other features.

Nomenclature

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example implementation" and "an example implementation" are to be read as "at least one example implementation." The term "another implementation" is to be read as "at least one other implementation." The terms "determined," "determines," or "determining" are to be read as obtaining, receiving, computing, calculating, estimating, predicting or deriving. In addition, in the following description and claims, unless defined otherwise, all technical and scientific terms used herein have the same meaning as commonly understood by one of ordinary skills in the art to which this disclosure belongs.

System Overview

The disclosed embodiments use a Voice Activity Detection (VAD) classifier to divide an audio input into speech segments containing speech and non-speech segments containing no speech. In the non-speech segments, at each frame in the non-speech segment, a noise spectrum is estimated by averaging the energy per frequency of a region of time around the current frame. In the speech segments, for each frame in the speech segment, the estimated noise spectrum of either a previous or a following non-speech region in time is selected by identifying one or more non-speech frequency components in the speech spectrum. The one or more non-speech frequency components are compared, using a similarity metric (e.g., a distance between frequency components), with corresponding one or more frequency components in the estimated noise spectra of the previous non-speech region and the following non-speech region.

Figure 1:
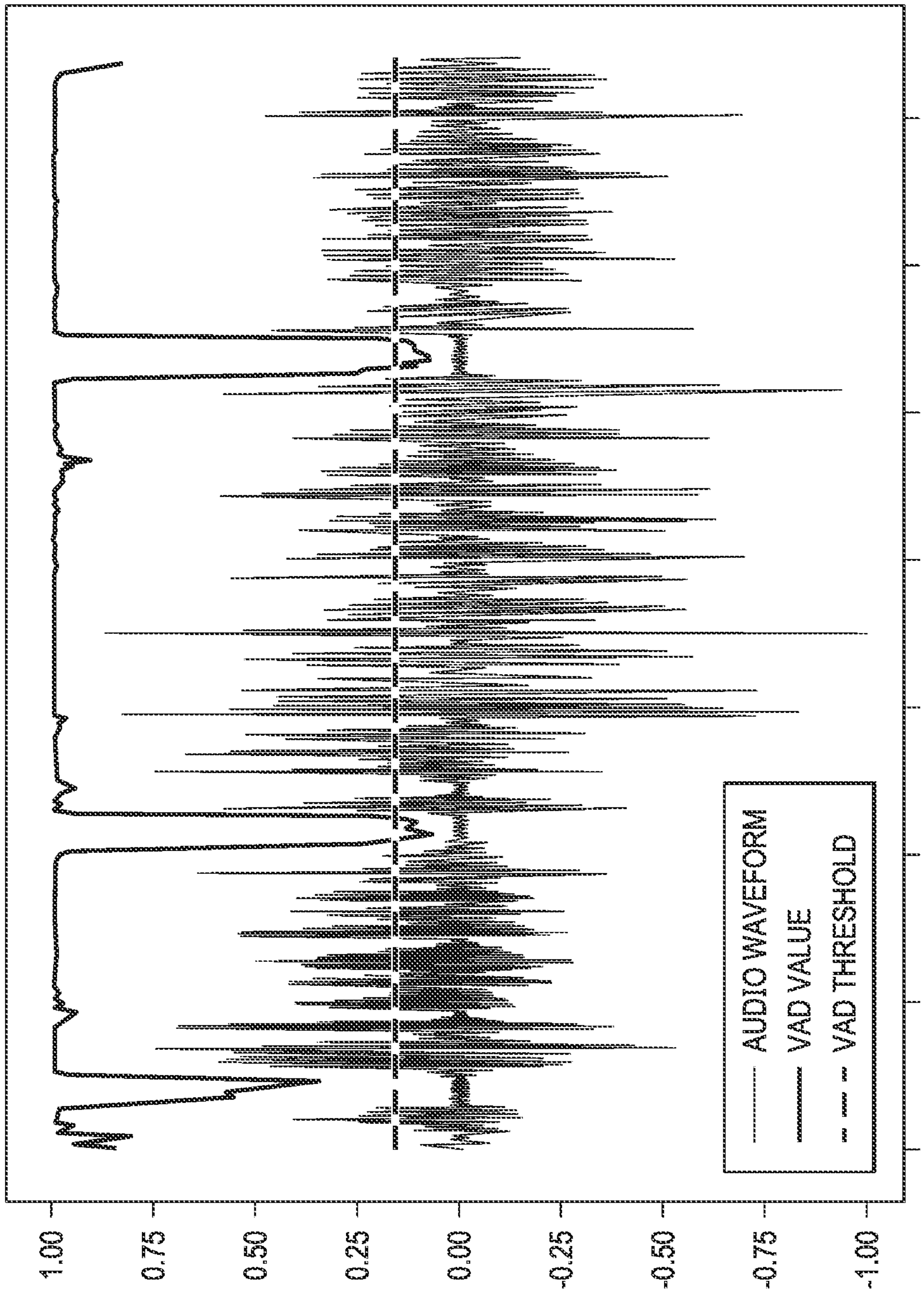
FIG. 1 is a two-dimensional (2D) plot showing an audio waveform, voice activity over time and a threshold used to determine non-speech segments of the audio waveform, according to some embodiments.
Figure 2:
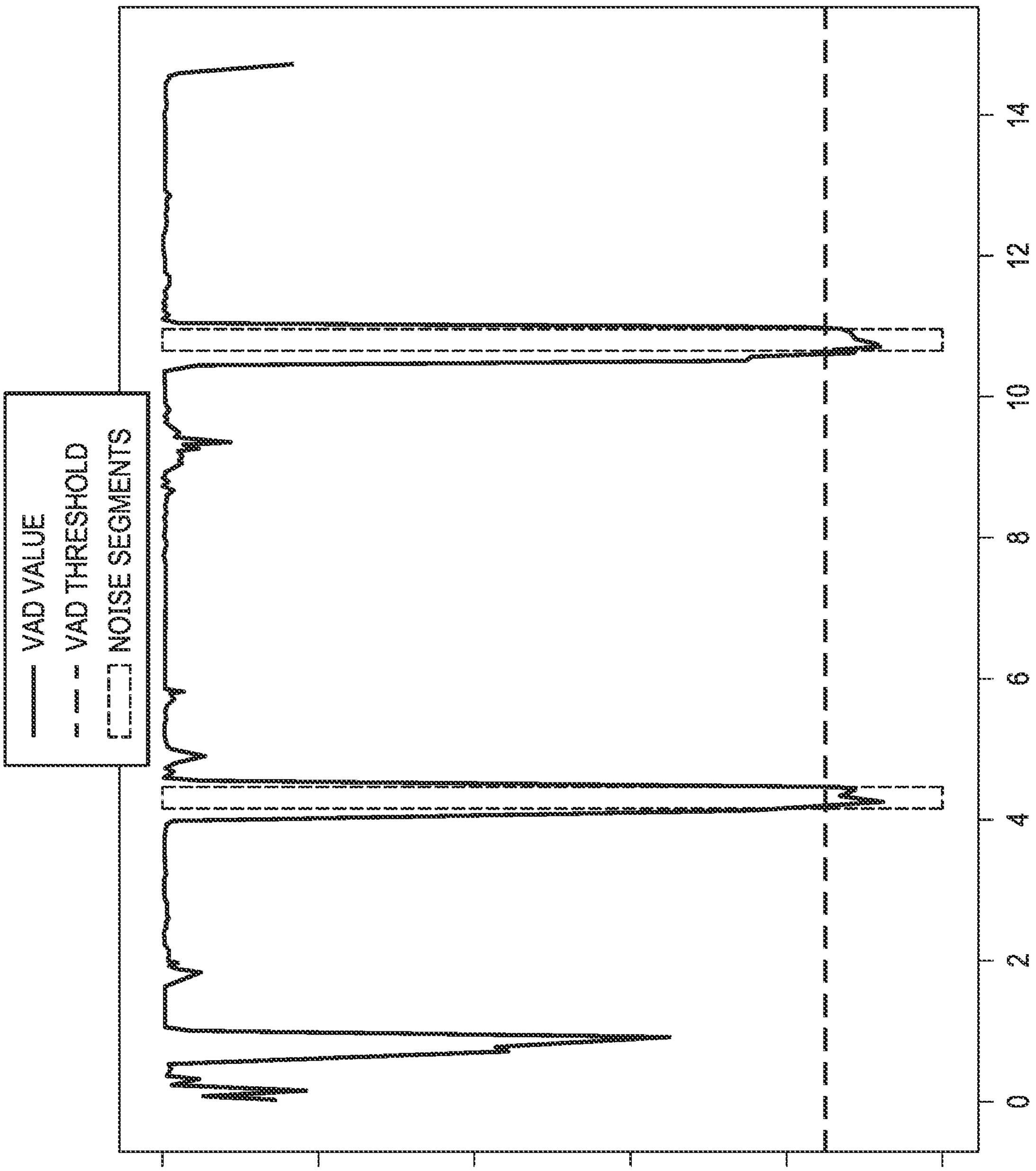
FIG. 2 is a 2D plot of voice activity over time, a threshold used to determine non-speech segments of the audio waveform and noise segments where the voice activity is lower than the threshold, according to some embodiments.

FIG. 1 is a two-dimensional (2D) plot showing an audio waveform, voice activity over time and a threshold used to determine non-speech segments of the audio waveform, according to an embodiment. For simplicity the amplitude values for the audio waveform are not shown in FIG. 1. The horizontal axis is in time units (e.g., milliseconds). An audio input (e.g., an audio file) containing an audio recording including speech is divided into overlapping frames. In an embodiment, a VAD is used to obtain a probability of speech in each frame and subsequently divide the audio input into speech segments and non-speech segments based on thresholding the speech probability. In the example shown, the vertical axis represents VAD values (probability that speech is present) and an example VAD threshold indicated by the horizontal line is about 0.18. FIG. 2 shows a close-up of the noise segments shown in FIG. 1, where the VAD values are lower than the VAD threshold.

Any suitable VAD algorithm for detecting speech and non-speech segments in an audio recording can be used, including but not limited to VAD algorithms based on zero crossing rate and energy measurement, linear based energy detection, adaptive linear based energy detection, pattern recognition and statistical measures.

In an embodiment, the noise spectrum in non-speech segments is estimated using adaptive voice-aware noise estimation (AVANE) and inferring most-similar robust noise estimation in the speech segments. AVANE computes a moving average of the power spectra of the non-speech frames, and for each non-speech frame, computes a power spectrum of the noise in the non-speech frame by averaging the power of a current non-speech frame and one or more past non-speech frames. In an embodiment, the number of past frames to average is determined by a time constant. Any suitable moving average algorithms can be used, including but not limited to: arithmetic, exponential, smoothed and weighted moving averages.

AVANE generates a time-varying noise spectrum that is used in two ways. First, during non-speech segments, the time-varying estimated noise is fed (e.g., fed buffer by buffer) to a noise reduction system. Second, during speech segments, the last AVANE estimation before the current speech segment and the first AVANE estimation after the current speech segment are fed to an inference component, together with the current speech frame. The inference component determines which AVANE estimation has the highest likelihood to represent the noise in the current speech frame.

Alternative methods to AVANE estimation include spectral minima tracking in subbands, as described in, for example, Doblinger, G. (1995). Computationally efficient speech enhancement by spectral minima tracking in subbands. Proc. EUROSPEECH'95, Madrid, pp 1513-1516, or noise power spectral density estimation based on optimal smoothing and minimum statistics, as described in, for example, Martin, R. (2001). Noise power spectral density estimation based on optimal smoothing and minimum statistics. IEEE Transactions on Speech and Audio Processing. 9 (5) 504-512.

Within a given speech segment, two embodiments are proposed to estimate the underlying noise spectrum of the speech segment. In the first embodiment, the speech components are estimated and then subtracted from the actual speech components to get a residual spectrum as a noise estimate. This embodiment leads to a direct estimation of background noise and is therefore not related to or combined with AVANE. Assuming speech is dominated by harmonic components, the pitch is first estimated, and the harmonics components are identified. Based on a sinusoidal model and its parameter estimation, harmonic components are subtracted from the speech signal to obtain the residual signal. This method is described in, for example, Stylianou, Y. (1996) Harmonic plus Noise Models for Speech combined with Statistical Methods for Speech and Speaker Modification, PhD Thesis, Telecom Paris. Another possibility is to identify and subtract the sinusoids in a given short-time spectrum without fundamental frequency (FO) information. This method is described in, for example, Yeh, C. (2008) Multiple Fundamental Frequency Estimation of Polyphonic Recordings. Ph.D. thesis, University Paris.

In another embodiment, harmonic components are estimated and attenuated in the cepstral domain, as described in, for example, Z. Zhang, K. Honda and J. Wei, "Retrieving Vocal-Tract Resonance and anti-Resonance From High-Pitched Vowels Using a Rahmonic Subtraction Technique," *ICASSP* 2020-2020 *IEEE International Conference on Acoustics, Speech and Signal Processing* (*ICASSP*), Barcelona, Spain, 2020, pp. 7359-7363, doi:

The AVANE method assumes the underlying noise spectrum is closer to either the last AVANE before the speech segment or the first AVANE after the speech segment. In this embodiment, a segment of the spectrum where speech is not dominant (e.g., the high frequencies) is identified, and a spectral similarity measure (e.g., a distance measure) between the speech spectrum and the AVANE is computed, considering only the non-speech segments of the spectrum where there are mainly noise components. In an embodiment, the spectral similarity measure is based on a distance between the speech spectrum and the AVANE. Assuming that the signal-to-noise (SNR) (defined as the ratio in decibels between the energy of speech and the energy of noise in the frequency bands of speech) is positive, a further constraint can be added to accept the selected AVANE only if the average speech spectrum in the region of interest (in a time duration of the same length as that of AVANE) is above the AVANE to be selected.

In the embodiments where the harmonic subtraction is used to compute an estimation of the noise spectrum, the spectral similarity measure may not be limited to the non-speech frequency regions of the speech spectrum, but can be extended to the entire spectrum, or limited to frequencies above a certain speech frequency, e.g. the lowest frequency range of speech, where the harmonic estimation is effective. The similarity measure is therefore computed between the residual signal after harmonic subtraction from a speech segment, and the AVANE estimations before and after the speech segment.

Figure 3:
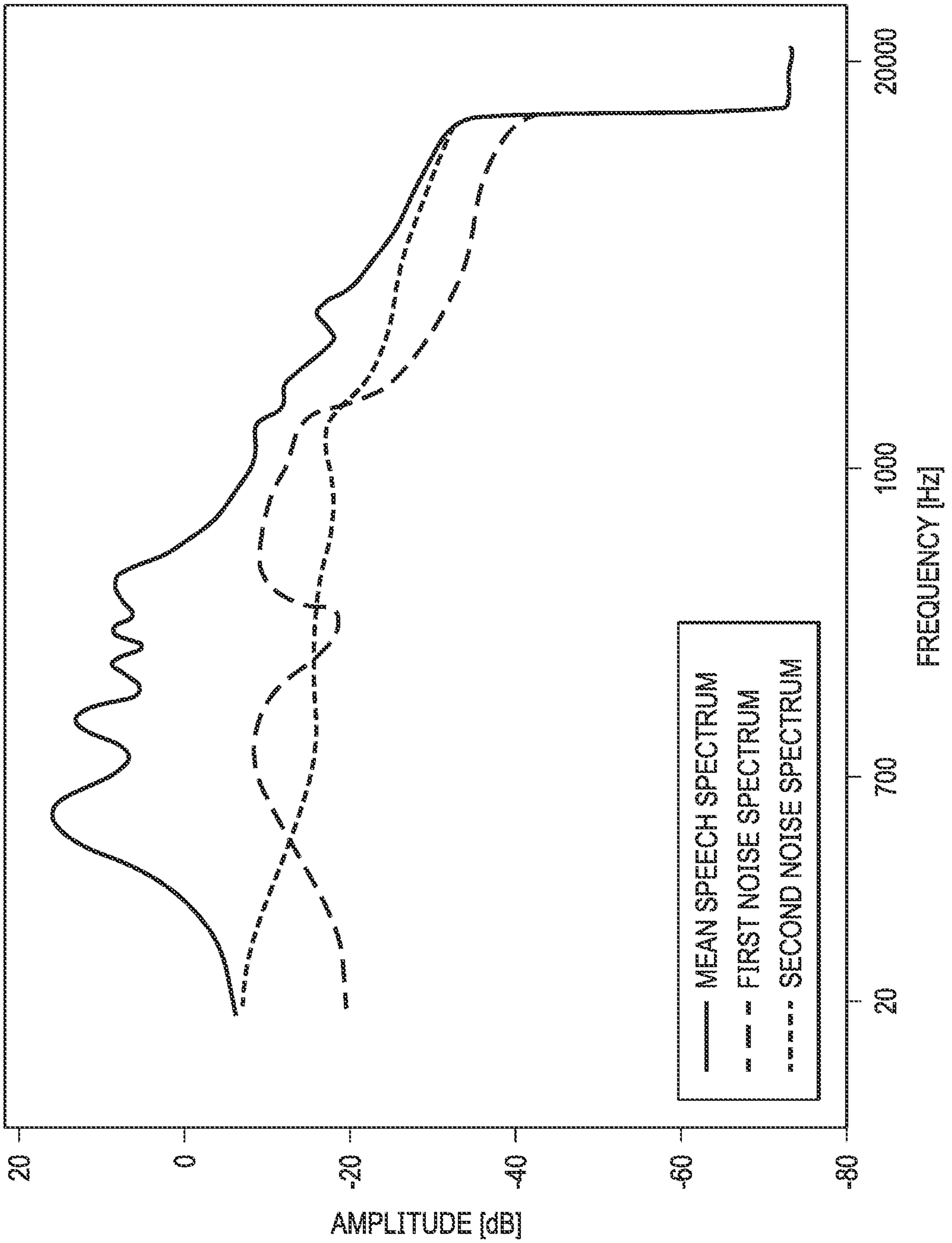
FIG. 3. shows a mean speech spectrum corresponding to a speech segment and two noise spectra corresponding to non-speech segments before and after the speech segment, according to some embodiments.

In an embodiment, given an audio frame, the energy spectrum of the audio frame is computed and converted to decibel scale. When the current audio frame is a speech frame (i.e., in a speech segment), the previously computed average noise spectra (in dBs) before and after the speech segment is obtained from, for example, storage (e.g., memory, disc). FIG. 3. shows a mean speech spectrum and two noise spectra corresponding to non-speech segments before and after the speech segment, according to some embodiments.

Given these two noise spectra and the current speech spectrum, the upper frequency limit $f_c$ of the noise spectra is computed and the lowest of the two limits is retained as a "cutoff" frequency $f_{cutoff}$. Next, a similarity metric, which in this example is the sum of the absolute value of the difference (a "distance") between the speech spectrum and the two noise spectra, is computed in a segment that goes from, for example, half of the audio spectrum to the cutoff frequency. The noise spectrum with the smallest distance (as previously defined) is retained as the current estimation of the noise spectrum for the audio recording. In an alternative embodiment, the distance measure can be calculated over a set of speech frames and averaged, and the noise spectrum that gives the lowest average distance is selected as the current estimation of the noise spectrum.

Assuming that audioframe is a vector of audio samples in a frame and spectrum is the frequency spectrum of the audio samples computed using a Fast Fourier Transform (FFT) of the audioframe:

$$\text{spectrum}=\mathit{fft}(\text{audioframe}). \quad [1]$$

Spectrum can be converted to dB scale $\text{spectrum}_{dB}$ by:

$$\text{spectrum}_{dB}=20\ \log_{10}(\text{abs}(\text{spectrum})). \quad [2]$$

If the current frame is a noise frame, then its $\text{spectrum}_{dB}$ is retained and averaged with a past spectrum in a window of given length (e.g. 5 seconds), hereinafter referred to $\text{avg\_spectrum}_{dB}$. If the current frame is a speech frame, its spectrum will be compared with the past noise spectrum and a future noise spectrum. Hereinafter, the speech spectrum is referred to as $\text{speech\_spectrum}_{dB}$, and the past and future noise spectra are referred to as $\text{past\_spectrum}_{dB}$ and $\text{future\_spectrum}_{dB}$, respectively.

In some embodiments, the upper frequency limit f c of each of the $\text{past\_spectrum}_{dB}$ and the $\text{future\_spectrum}_{dB}$ is determined by: 1) choosing a first frequency above which f c is to be estimated; 2) dividing the noise spectrum above the first frequency into blocks of a specified length and overlap (e.g., 50%); 3) in each block, computing the average derivatives, ordered in increasing frequency of their corresponding blocks, finding the first derivative that has a value smaller than a predefined negative value (e.g., −20 dB); and 4) computing the average of the noise spectrum in a small region before the f c and replacing the values of the noise spectrum above f c with the average noise spectrum. Note that step (3) is interpreted as a significant falloff on the noise spectrum, and the frequency of the corresponding block is considered the upper frequency limit.

Given the cutoff frequency $f_{cutoff}$, as the lower of the determined upper frequency limits $f_c$ and the frequency above speech $f_1$, the distance between the current speech spectrum and the noise spectrum is computed as:

$$\text{distance\_past} = \sum_{f=f_1}^{f_{cutoff}} |\text{speech\_spectrum}_{dB}(f) - \text{past\_spectrum}_{dB}(f)|, \quad [3a]$$

$$\text{distance\_future} = \sum_{f=f_1}^{f_{cutoff}} |\text{speech\_spectrum}_{dB}(f) - \text{future\_spectrum}_{dB}(f)|, \quad [3b]$$

$$\text{noise\_spectrum}_{selected}=\text{argmin}(\text{distance\_past},\text{distance\_ future}). \quad [4]$$

As shown in Equation [4], the frequency range between/ land f cutoff defines a spectral region where speech harmonics are almost absent, and the background noise is dominant. The minimum value (given by argmin( )) among distance_past and distance_future gives the noise spectrum that is closer to the current spectrum, and that is chosen as a noise candidate. This approach can be extended to a plurality of candidate noise spectra.

Note that in embodiments where harmonic subtraction is used to estimate and remove the speech harmonics, the method described in equations 3a, 3b and 4 can be extended to speech frequencies by replacing the starting index $f_1$ with a lower frequency index, e.g. the lowest frequency of speech or the lowest frequency where the residual estimation is deemed reliable.

Note that given any method described herein that is capable of estimating noise in presence of speech (e.g., the AVANE method), the distance between the estimated spectrum and the two known noise spectra can be computed by comparing the current frame with the estimations obtained from AVANE in neighboring non-speech segments, and choosing either the past or future noise estimation, as described above.

Figure 4:
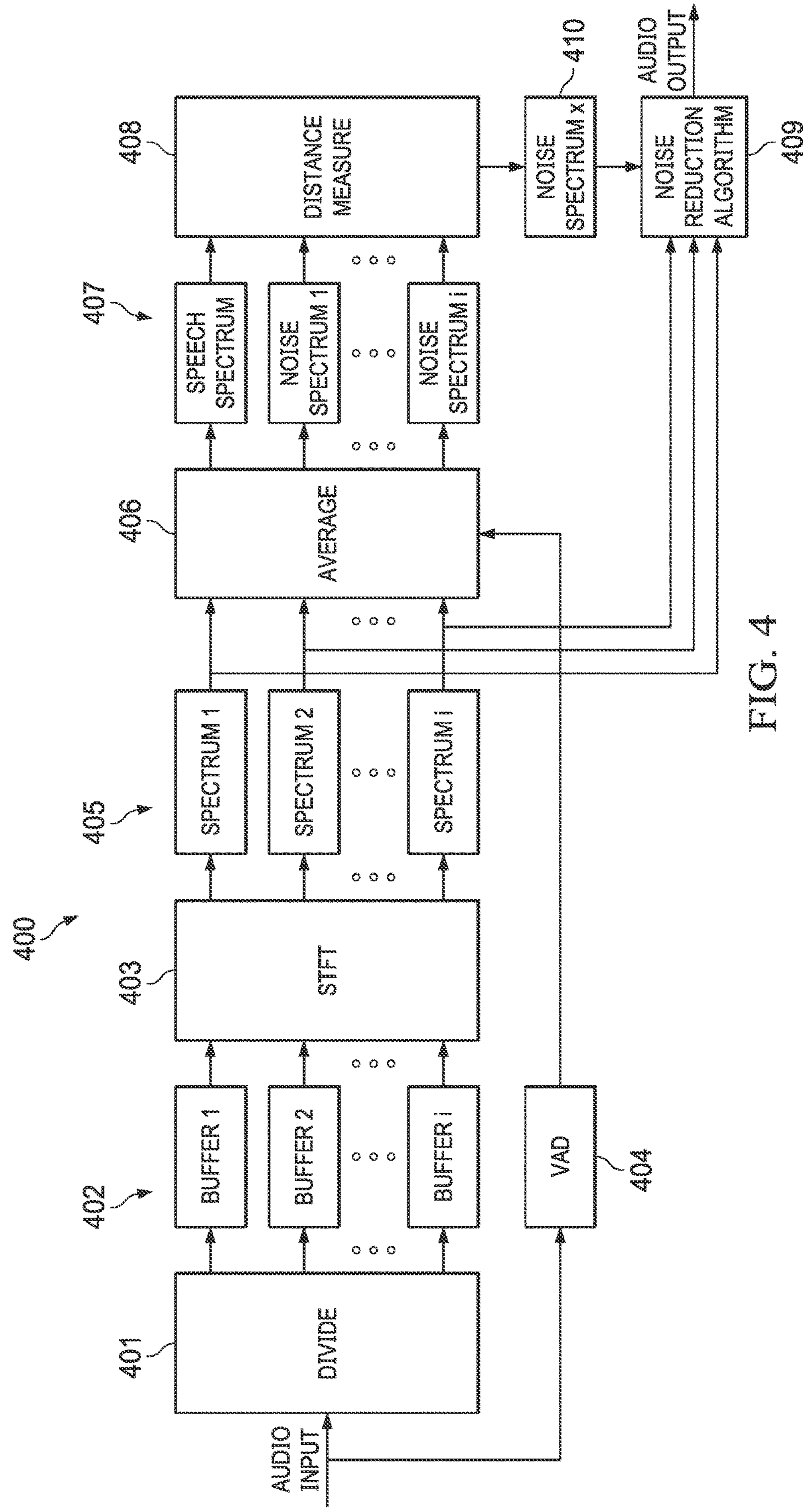
FIG. 4 is a block diagram of a system for adaptive noise estimation and noise reduction, according to some embodiments.

FIG. 4 is a block diagram of system 400 for adaptive noise estimation and noise reduction, according to an embodiment. An audio input (e.g., an audio file containing speech content) is divided into overlapping segments of frames by the divider unit 401, and the resulting segments are stored in a plurality of buffers 402, which are transformed into spectra 405 by, for example, a short-time Fourier transform (STFT) block 403. Voice Activity Detection (VAD) block 404 computes the probability that a given audio frame contains speech. The spectra 405 and the VAD output (speech probabilities) are fed to the averaging unit 406 which produces, for each frame of speech, the current speech spectrum and a plurality of noise spectra 407. The speech spectrum and the plurality of noise spectra 407 are input into similarity metric unit 408, which selects one of the noise spectra (based on, e.g., the distance metrics of Equations [3a, 3b]) as the noise spectrum 410 to be used by noise reduction block 409 to reduce noise in the audio input.

In some embodiments, noise reduction unit 409 reduces noise in the audio input using the selected noise spectrum 410 by comparing the spectrum of the audio input with the selected noise spectrum 410, and applying gain reduction to those frequency bands where the energy of the input signal is less than the energy of the noise spectrum plus a predefined threshold.

Other Embodiments

The following description of further embodiments focus on the differences between the further embodiments and the previously described embodiment. Therefore, features which are common to both embodiments will be omitted from the following description, and so it should be assumed that features of the previously described embodiment are or at least can be implemented in the further embodiments, unless the following description thereof requires otherwise.

In some embodiments, a plurality of pre-computed noise spectra is available, $$\text{noise\_spectrum}_i, \text{with } i=1, \ldots, N, \quad [5]$$

and the similarity measure is the distance between the current speech spectrum and the plurality of noise spectra (in dB scale) given by:

$$\text{distance}_i = \sum_{f=f_1}^{f_{cutoff}} |\text{speech\_spectrum}(f) - \text{noise\_spectrum}_i(f)|. \quad [6]$$

The noise spectrum corresponding to the smaller distance is selected as:

$$\text{noise\_spectrum}_K, \text{with } K=\text{argmin}(\text{distance}_i). \quad [7]$$

The plurality of noise spectra can be provided a priori, e.g., in an application where the different noise conditions found in the audio recording are known and measured in advance, such as in a conference call with multiple endpoints. Alternatively, the plurality of noise spectra can be determined by a clustering algorithm applied to the plurality of spectra of non-speech frames. The clustering algorithm can be, for example, a k-means clustering algorithm applied to the plurality of non-speech spectra vectors, or any other suitable clustering algorithm.

Online Embodiments

The embodiments described above for offline computation can be extended to a real-time, online, low-latency scenario. Note that in this case, the future noise spectrum after the current speech frame cannot be used. When the candidate noise spectra are provided a priori, the selection process is applied online at every speech frame using the available (stored) noise spectra. When the candidate noise spectra are not provided a priori, the noise spectra can be built online. For example, a first noise spectrum is obtained from a first non-speech frame. As additional non-speech frames are received, their noise spectra are computed and retained as additional noise spectra, if their distance from each previously retained noise spectrum is larger than a pre-defined threshold. As additional non-speech frames are received, their noise spectra are computed and clustered by a clustering algorithm (e.g., k-means clustering), and the obtained clusters are used as candidate noise spectra. The clustering process is repeated and refined every time a sufficient number of new non-speech frames are received, or every time a non-speech frame with large dissimilarity with respect to the existing clusters is received.

Music Recordings

In an embodiment, the audio recording includes music (or another class of audio content) instead of speech content. In this embodiment, the speech classifier VAD is replaced with a suitable music (or another class) classifier.

Music Plus Speech Recordings

In an embodiment, the audio recording includes both speech and music. In this embodiment, it is desirable to clean the noise from the speech and music parts but preserve the music signal. In this embodiment, the speech classifier is replaced by a multi-class classifier (e.g. a music and speech classifier), or two separate classifiers for music and speech. The speech and music probabilities output by the classifiers are compared against predefined thresholds, and a frame is considered noise when both the speech and music probabilities are smaller than the predefined thresholds. The previously described methods are then applied to estimate a suitable noise spectrum for the speech regions, and optionally for the music regions too.

Example Process

Figure 5:
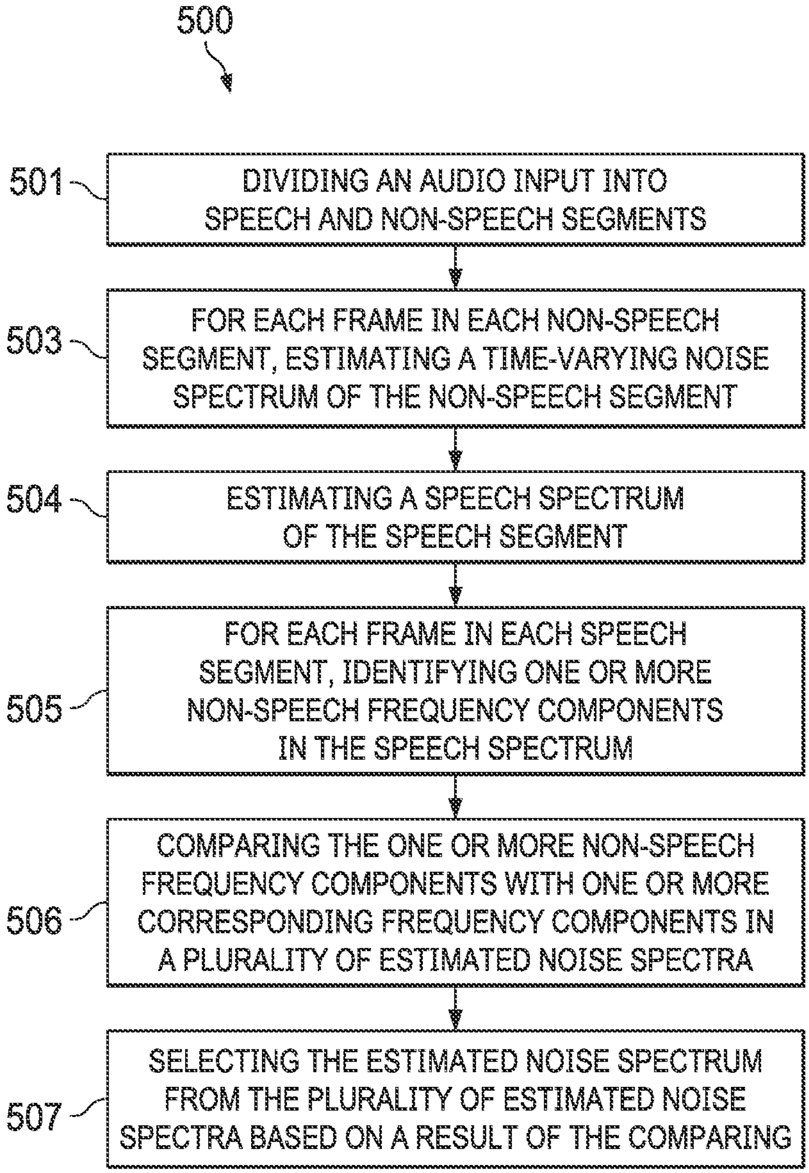
FIG. 5 is a flow diagram of a process for noise floor estimation and noise reduction, according to some embodiments.

FIG. 5 is a flow diagram of a process 500 for noise floor estimation and noise reduction, according to an embodiment. Process 500 can be implemented using the device architecture shown in FIG. 6.

Process 500 begins by dividing an audio input into speech and non-speech segments (501), and for each frame in each non-speech segment, estimating a time-varying noise spectrum of the non-speech segment (503) and a speech spectrum of the speech segment (504).

Process 500 continues by, for each frame in each speech segment, identifying one or more non-speech frequency components in the speech spectrum (505), comparing the one or more non-speech frequency components with one or more corresponding frequency components in a plurality of estimated noise spectra (506); and selecting the estimated noise spectrum from the plurality of estimated noise spectra based on a result of the comparing (507).

In some embodiments, the plurality of estimated noise spectra comprises an estimated noise spectrum for a past non-speech segment and an estimated noise spectrum for a future non-speech segment. In some embodiments, the plurality of estimated noise spectra can be determined by a clustering algorithm applied to a plurality of noise spectra of non-speech frames. The clustering algorithm can be, for example, a k-means clustering algorithm applied to the plurality of non-speech spectra vectors, or any other suitable clustering algorithm.

In some embodiments, process 500 can continue by reducing noise in the audio input using the selected estimated noise spectrum.

Example System Architecture

Figure 6:
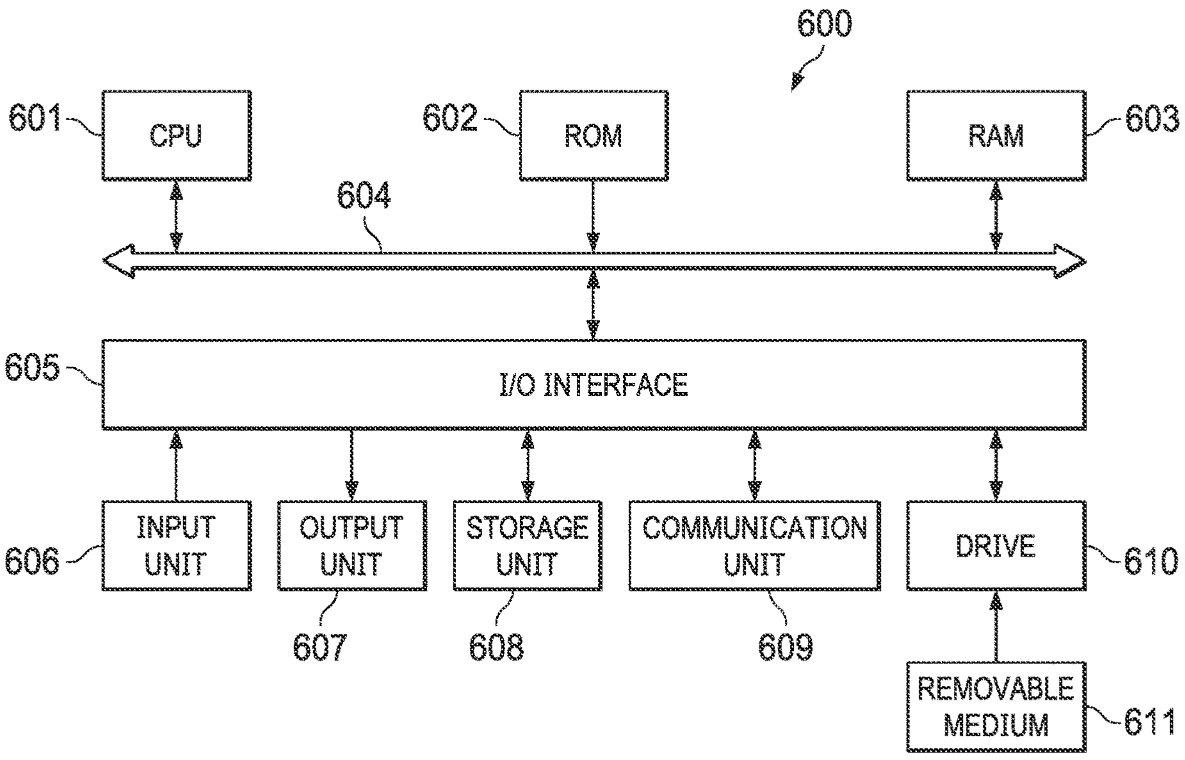
FIG. 6 is a block diagram of a system for implementing the features and processes described in reference to FIGS. 1-5, according to some embodiments.

FIG. 6 shows a block diagram of an example system for implementing the features and processes described in reference to FIGS. 1-5, according to an embodiment. System 600 includes any devices that are capable of playing audio, including but not limited to: smart phones, tablet computers, wearable computers, vehicle computers, game consoles, surround systems, kiosks.

As shown, the system 600 includes a central processing unit (CPU) 601 which is capable of performing various processes in accordance with a program stored in, for example, a read only memory (ROM) 602 or a program loaded from, for example, a storage unit 608 to a random access memory (RAM) 603. In the RAM 603, the data required when the CPU 601 performs the various processes is also stored, as required. The CPU 601, the ROM 602 and the RAM 603 are connected to one another via a bus 609. An input/output (I/O) interface 605 is also connected to the bus 604.

The following components are connected to the I/O interface 605: an input unit 606, that may include a keyboard, a mouse, or the like; an output unit 607 that may include a display such as a liquid crystal display (LCD) and one or more speakers; the storage unit 608 including a hard disk, or another suitable storage device; and a communication unit 609 including a network interface card such as a network card (e.g., wired or wireless).

In some implementations, the input unit 606 includes one or more microphones in different positions (depending on the host device) enabling capture of audio signals in various formats (e.g., mono, stereo, spatial, immersive, and other suitable formats).

In some implementations, the output unit 607 include systems with various number of speakers. As illustrated in FIG. 6, the output unit 607 (depending on the capabilities of the host device) can render audio signals in various formats (e.g., mono, stereo, immersive, binaural, and other suitable formats).

The communication unit 609 is configured to communicate with other devices (e.g., via a network). A drive 610 is also connected to the I/O interface 605, as required. A removable medium 611, such as a magnetic disk, an optical disk, a magneto-optical disk, a flash drive or another suitable removable medium is mounted on the drive 610, so that a computer program read therefrom is installed into the storage unit 608, as required. A person skilled in the art would understand that although the system 600 is described as including the above-described components, in real applications, it is possible to add, remove, and/or replace some of these components and all these modifications or alteration all fall within the scope of the present disclosure.

In accordance with example embodiments of the present disclosure, the processes described above may be implemented as computer software programs or on a computer-readable storage medium. For example, embodiments of the present disclosure include a computer program product including a computer program tangibly embodied on a machine readable medium, the computer program including program code for performing methods. In such embodiments, the computer program may be downloaded and mounted from the network via the communication unit 609, and/or installed from the removable medium 611, as shown in FIG. 6.

Generally, various example embodiments of the present disclosure may be implemented in hardware or special purpose circuits (e.g., control circuitry), software, logic or any combination thereof. For example, the units discussed above can be executed by control circuitry (e.g., a CPU in combination with other components of FIG. 6), thus, the control circuitry may be performing the actions described in this disclosure. Some aspects may be implemented in hardware, while other aspects may be implemented in firmware or software which may be executed by a controller, microprocessor or other computing device (e.g., control circuitry). While various aspects of the example embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

Additionally, various blocks shown in the flowcharts may be viewed as method steps, and/or as operations that result from operation of computer program code, and/or as a plurality of coupled logic circuit elements constructed to carry out the associated function(s). For example, embodiments of the present disclosure include a computer program product including a computer program tangibly embodied on a machine readable medium, the computer program containing program codes configured to carry out the methods as described above.

In the context of the disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may be non-transitory and may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Computer program code for carrying out methods of the present disclosure may be written in any combination of one or more programming languages. These computer program codes may be provided to a processor of a general purpose computer, special purpose computer, or other programmable data processing apparatus that has control circuitry, such that the program codes, when executed by the processor of the computer or other programmable data processing apparatus, cause the functions/operations specified in the flowcharts and/or block diagrams to be implemented. The program code may execute entirely on a computer, partly on the computer, as a stand-alone software package, partly on the computer and partly on a remote computer or entirely on the remote computer or server or distributed over one or more remote computers and/or servers.

Enumerated Example Embodiments (EEEs)

Embodiments of the present disclosure may relate to one of the enumerated embodiments (EEEs) listed below.

EE1 is an audio processor comprising: a divider unit configured to divide an audio input into segments of overlapping frames; a plurality of buffers configured to store the segments of overlapping frames; a spectrum analysis unit configured to compute a frequency spectrum for each segment stored in each buffer; a voice activity detector (VAD) configured to detect speech and non-speech segments in the audio input; an averaging unit coupled to the output of the VAD and configured to compute, for each speech segment identified by the VAD output, speech spectra and for each non-speech segment identified by the VAD output, noise spectra; a similarity metric unit configured to compute a similarity metric between one or more frequency components in a current speech spectrum and each noise spectrum, and to select one noise spectrum from the plurality of noise spectra based on the similarity metric; and a noise reduction unit configured to use the selected noise spectra to reduce noise in the audio input.

EEE2 is the audio processor of EEE1, wherein the VAD is configured to obtain a probability of speech in each frame of the audio input and identify the frame as containing speech based on the probability.

EEE3 is an audio processor comprising: a voice activity detector (VAD) configured to detect speech and non-speech segments in audio input; an averaging unit coupled to the output of the VAD and configured to obtain, for each speech segment identified by the VAD output, a speech spectrum and for each non-speech segment identified by the VAD output, a noise spectrum; a similarity metric unit configured to compute a similarity metric between one or more frequency components in a current speech spectrum and corresponding one or more frequency components in each noise spectrum, and to select one noise spectrum from the noise spectra based on the similarity metric; and a noise reduction unit configured to use the selected noise spectrum to reduce noise in the audio input.

While this document contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination. Logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method of adaptive noise estimation, comprising:
- dividing, using at least one processor, an audio input into speech and non-speech segments;
- for each frame in each non-speech segment, estimating, using the at least one processor, a time-varying noise spectrum of the non-speech segment and reducing noise in the audio input based on the time-varying noise spectrum;
- for each frame in each speech segment:
  - estimating, using the at least one processor, a speech spectrum of the speech segment;
  - identifying one or more non-speech frequency components in the speech spectrum;
  - comparing the one or more non-speech frequency components with one or more corresponding frequency components in a plurality of estimated noise spectra, wherein the plurality of estimated noise spectra comprises a first estimated noise spectrum for a past non-speech segment and a second estimated noise spectrum for a future non-speech segment;
  - selecting one of the first or second estimated noise spectrums based on a result of the comparing; and
  - reducing noise in the audio input based on the selected first or second estimated noise spectrum.

2. The method of claim 1, further comprising:
- obtaining a probability of speech in each frame of the audio input and identifying a frame containing speech based on the probability.

3. The method of claim 1, wherein the time-varying noise spectrum is estimated by computing a moving average of power spectra of the non-speech segments, and averaging the power spectra of a current non-speech segment and at least one past non-speech segment.

4. The method of claim 1, wherein for each speech segment, a past estimated noise spectrum before the speech segment, a future estimated noise spectrum after the speech segment and a current speech frame, are used to determine the estimated noise spectrum that has a highest likelihood to represent noise in the current speech segment.

5. The method of claim 4, wherein determining the estimated noise spectrum that has the highest likelihood to represent the noise of the current speech segment, further comprises:
- obtaining an average noise spectrum from past and future noise spectra of past and future non-speech segments before and after the speech segment, respectively;
- determining an upper frequency limit for the past and future noise spectra;
- determining a cutoff frequency to be the lowest one of the two upper frequency limits;
- computing a distance metric between frequency components in the speech spectrum and frequency components in the noise spectra; and
- selecting one of the past or future noise spectrum that has the smallest distance metric up to the cutoff frequency as the estimated noise spectrum for the audio input.

6. The method of claim 5, wherein the distance metric is averaged over a set of speech frames in a speech segment.

7. The method of claim 1, wherein speech components are estimated in the speech segments of the audio signal, and then subtracted from actual speech components to obtain a residual spectrum as the estimated non-speech frequency components.

8. A non-transitory, computer-readable storage medium having stored thereon instructions that when executed by one or more processors, cause the one or more processors to perform operations of claim 1.

9. An audio processor comprising:
- a divider unit configured to divide an audio input into speech and non-speech segments;
- an averaging unit configured to estimate, for each speech segment speech spectra and for each non-speech segment time-varying noise spectra;
- a similarity metric unit configured to:
  - identify one or more non-speech frequency components in the speech spectra;
  - compare the one or more non-speech frequency components with one or more corresponding frequency components in a plurality of estimated noise spectra, wherein the plurality of estimated noise spectra comprises a first estimated noise spectrum for a past non-speech segment and a second estimated noise spectrum for a future non-speech segment;
  - select one of the first or second estimated noise spectrums based on a result of the comparing; and
- a noise reduction unit configured to:
  - for non-speech segments, reduce noise in the audio input based on the time-varying noise spectra; and
  - for speech segments, reduce noise in the audio input based on the selected first or second estimated noise spectrum.

10. The audio processor of claim 9, wherein the noise reduction unit is configured to reduce noise in the audio input using the selected estimated noise spectrum by comparing the spectrum of the audio input with the selected estimated noise spectrum, and applying gain reduction to frequency bands where an energy of the audio input is less than an energy of the noise spectrum plus a predefined threshold.

11. The audio processor of claim 9, wherein a voice activity detector (VAD) is configured to obtain a probability of speech in each frame of the audio input and identify a frame containing speech based on the probability; or
- wherein the averaging unit is configured to estimate the time-varying noise spectra by computing a moving average of power spectra of the non-speech segments, and averaging the power spectra of a current non-speech segment and at least one past non-speech segment.

12. The audio processor of claim 9, wherein for each speech segment, the similarity metric unit is configured to determine the estimated noise spectrum that has a highest likelihood to represent noise in the current speech segments based on a past estimated noise spectrum before the speech segment, a future estimated noise spectrum after the speech segment and a current speech frame.

13. The audio processor of claim 12, wherein the similarity metric unit is configured to determine the estimated noise spectrum that has the highest likelihood to represent the noise of the current speech segment by:
- obtaining an average noise spectrum from past and future noise spectra of past and future non-speech segments before and after the speech segment, respectively;

determining an upper frequency limit for the past and future noise spectra;

determining a cutoff frequency to be the lowest one of the two upper frequency limits;

computing a distance metric between frequency components in the speech spectrum and frequency components in the noise spectra; and selecting one of the past or future noise spectrum that has the smallest distance metric up to the cutoff frequency as the estimated noise spectrum for the audio input.

14. The audio processor of claim 13, wherein the similarity metric unit is configured to average the distance metric over a set of speech frames in a speech segment.

15. The audio processor of claim 9, wherein the similarity metric unit is configured to estimate the one or more speech components in the speech segments of the audio input, and then subtract the one or more estimated speech components from actual speech components to obtain a residual spectrum as the estimated non-speech frequency spectrum.

* * * * *